(12) United States Patent
Cairns et al.

(10) Patent No.: US 9,348,399 B2
(45) Date of Patent: May 24, 2016

(54) HEURISTICS BASED ON BACKOFF FOR POWER MODES

(75) Inventors: Ryan Cairns, Los Altos, CA (US); Ryan Tabone, San Francisco, CA (US)

(73) Assignee: Google Inc., Mountain View, CA (US)

( * ) Notice: Subject to any disclaimer, the term of this patent is extended or adjusted under 35 U.S.C. 154(b) by 414 days.

(21) Appl. No.: 13/099,873

(22) Filed: May 3, 2011

(65) Prior Publication Data

US 2015/0089262 A1    Mar. 26, 2015

(51) Int. Cl.
    *G06F 1/32*    (2006.01)
(52) U.S. Cl.
    CPC ............ *G06F 1/3231* (2013.01); *G06F 1/3203* (2013.01); *G06F 1/3215* (2013.01)
(58) Field of Classification Search
    CPC .................................................... G06F 1/3203
    USPC .......................................................... 713/323
    See application file for complete search history.

(56) References Cited

U.S. PATENT DOCUMENTS

| | | | |
|---|---|---|---|
| 5,194,895 A | 3/1993 | Bares | |
| 6,516,421 B1 | 2/2003 | Peters | |
| 6,654,895 B1 * | 11/2003 | Henkhaus et al. ............ | 713/320 |
| 7,383,457 B1 | 6/2008 | Knight | |
| 7,870,401 B2 * | 1/2011 | Diab et al. ..................... | 713/300 |
| 8,063,872 B2 | 11/2011 | Forstall et al. | |
| 8,255,090 B2 * | 8/2012 | Frader-Thompson et al. ............................. | 700/295 |
| 8,281,166 B2 * | 10/2012 | Carroll .......................... | 713/310 |
| 8,375,208 B2 * | 2/2013 | Darapu et al. ................. | 713/168 |
| 8,412,387 B2 * | 4/2013 | Park et al. ...................... | 700/297 |
| 8,473,325 B2 * | 6/2013 | Barnhill, Jr. et al. ......... | 705/7.29 |
| 2002/0144268 A1 * | 10/2002 | Khoo et al. ....................... | 725/47 |
| 2007/0050654 A1 | 3/2007 | Switzer et al. | |
| 2009/0132698 A1 * | 5/2009 | Barnhill, Jr. ................... | 709/224 |
| 2009/0320055 A1 * | 12/2009 | Langille et al. ................. | 725/14 |
| 2010/0153764 A1 | 6/2010 | Pratt et al. | |
| 2010/0161149 A1 * | 6/2010 | Nguyen et al. ................ | 700/296 |
| 2011/0040990 A1 * | 2/2011 | Chan et al. .................... | 713/300 |
| 2013/0082916 A1 | 4/2013 | Dixit | |

FOREIGN PATENT DOCUMENTS

WO       03/094428 A2    11/2003

OTHER PUBLICATIONS

"Managing Power with Group Policy: Part 2 of 3", Ask the Directory Services Team, Mar. 19, 2008, 2 pages.
"Screen Saver Taking Longer to Start ? In Windows 7 and Vista", Windows 7 Hacker, Aug. 24, 2009, 5 pages.

* cited by examiner

*Primary Examiner* — Kim Huynh
*Assistant Examiner* — Eric Chang
(74) *Attorney, Agent, or Firm* — Brake Hughes Bellermann LLP

(57) ABSTRACT

According to one general aspect, a method may include monitoring, by a computing device, a user's current behavior in regards to the computing device. The method may also include determining whether to place the computing device in a reduced power mode based upon the user's monitored current behavior and based on a history of user habits in regards to one or more computing devices. In various implementations, the method may further include, if it is determined to place the computing device in the reduced power mode, placing the computing device in the reduced power mode.

20 Claims, 7 Drawing Sheets

FIG. 6
600

602 Monitoring a user's behavior in regards to a computing device.

604 Determining whether or not to place the computing device in a reduced power mode based upon the user's current behavior and a history of user habits.

606 If it is determined to place the computing device in the reduced power mode, placing the computing device in the reduced power mode.

608 Receiving a request from the user to remove the computing device from the reduced power mode.

610 Adjusting the history of user habits to reflect the request from the user.

612 Removing the computing device from the reduced power mode.

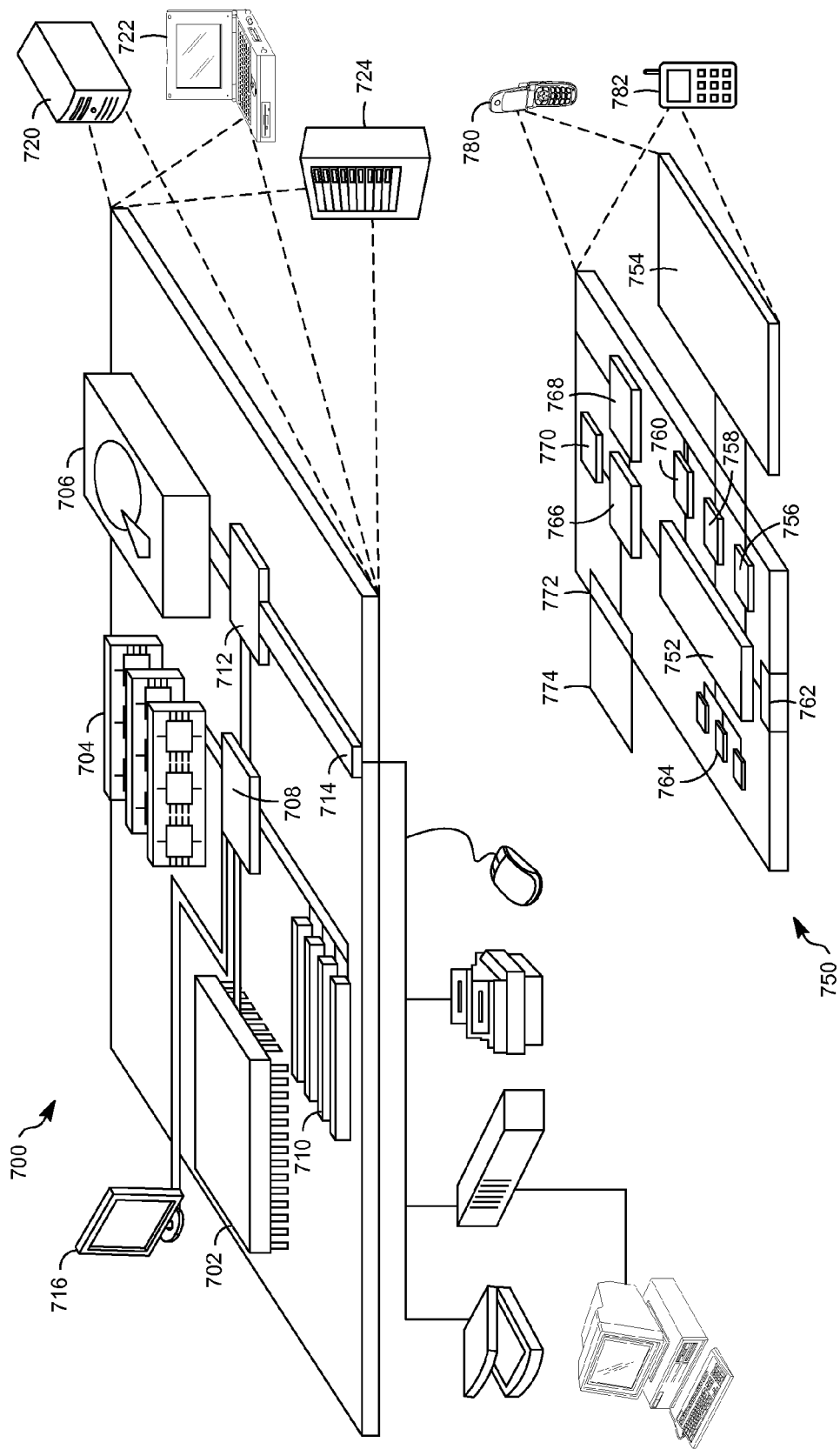

HEURISTICS BASED ON BACKOFF FOR POWER MODES

TECHNICAL FIELD

This description relates to power management of a computing device, and more specifically to the intelligent selection of when, how, of in what way to change of the power state of the computing device.

BACKGROUND

Modern computing devices (e.g., desktop computers, laptops, netbooks, tablets, smartphones, etc.) can generally operate in one of a plurality of power modes or power states. These power modes may range from a "Working" power mode, in which the computing device is fully powered and operational, to an "Off" power mode in which the device is fully powered down and non-operational. Traditionally this "Working" power mode is the default operating mode of computing devices. However, there are power modes in between these two power modes (Working and Off) that trade-off functionality for power savings or reduced power consumption.

For example, a low-power state of the computing device may be referred to as "Standby," "Sleep," or "Suspend to RAM" or "Suspend." In such a low-power state, aside from powering the random access memory ("RAM") that is required to restore the computing device's state, the computing device attempts to reduce or cut power to all unneeded parts of the machine (e.g., the hard disk(s) stop spinning, the display device is placed into a dark or low-power state, and peripheral devices are de-powered). Such a low-power state often is called Standby (for computing devices running a Microsoft Windows 95-Server 2003 operating system), or is called Sleep (for computing devices running an Apple operating system or a Windows Vista, Windows 7, Windows Server 2008 operating system), or Suspend (for computing devices running a Linux operating system). In such a state, the processing functions of the computing device are powered down, and some small amount of power is used to preserve the contents of RAM and support waking up the computing device from the low-power state into the normal or full power state. When the computing device is placed into the Standby, Sleep, or Suspend to RAM state, it typically consumes less than about 20% of the total power than is consumed with the device is in the normal or full power mode. In various systems this sleep power mode may also be referred to "standby," "suspend," "suspend-to-memory," or Advanced Configuration and Power Interface (ACPI) power state S3.

Various other power states are known to exist. For example, a computing device may turn off or place in standby individual components or sub-systems of the computing device. Examples may include placing a monitor component in standby or an off power mode if there has been no user interaction after a predetermined period of time. In another example, a hard drive may be placed in standby, turned off, or "spun-down" if no access (e.g., reading or writing, etc.) has occurred to the hard drive for a preconfigured period of time. These component or sub-system standby power modes may be referred to as ACPI device power mode D1 or D2. The device off power mode may be referred to as ACPI device power mode D0. Various computing device architectures may employ other power mode schemes besides ACPI.

SUMMARY

According to one general aspect, a method may include monitoring, by a computing device, a user's current behavior in regards to the computing device. The method may also include determining whether to place the computing device in a reduced power mode based upon the user's monitored current behavior and based on a history of user habits in regards to one or more computing devices. In various implementations, the method may further include, if it is determined to place the computing device in the reduced power mode, placing the computing device in the reduced power mode.

According to another general aspect, an apparatus may include one or more processors and a memory. In various implementations, the memory may be configured to store executable code. In such an implementation, when executed by the one or more processors, the code may cause the apparatus to monitor a user's current behavior in regards to the apparatus. The code may also cause the apparatus to determine whether to place at least a portion of the apparatus in a reduced power mode based upon the user's monitored current behavior and a history of user habits in regards to one or more computing devices. The code may also cause the apparatus to, if it is determined to place at least a portion of the apparatus in the reduced power mode, place at least a portion of the apparatus in the reduced power mode.

According to another general aspect, a computer-readable medium may be tangibly embodied on a computer-readable storage medium and include executable code that, when executed, causes an apparatus to monitor a user's behavior in regards to the apparatus. In various implementations, the code may cause the apparatus to determine whether to place at least a portion of the apparatus in a reduced power mode based upon the user's monitored behavior and a history of user habits in regards to one or more computing devices. In some implementations, the code may cause the apparatus to, if it is determined to place at least a portion of the apparatus in the reduced power mode, placing the at least a portion of the apparatus in the reduced power mode The details of one or more implementations are set forth in the accompanying drawings and the description below. Other features will be apparent from the description and drawings, and from the claims.

A system and/or method for managing power usage, substantially as shown in and/or described in connection with at least one of the figures, as set forth more completely in the claims.

BRIEF DESCRIPTION OF THE DRAWINGS

FIG. 6 is a flowchart of an example implementation of a technique in accordance with the disclosed subject matter.

FIG. 7 is a block diagram of an example implementation of a system in accordance with the disclosed subject matter.

Like reference symbols in the various drawings indicate like elements.

DETAILED DESCRIPTION

Figure 1:
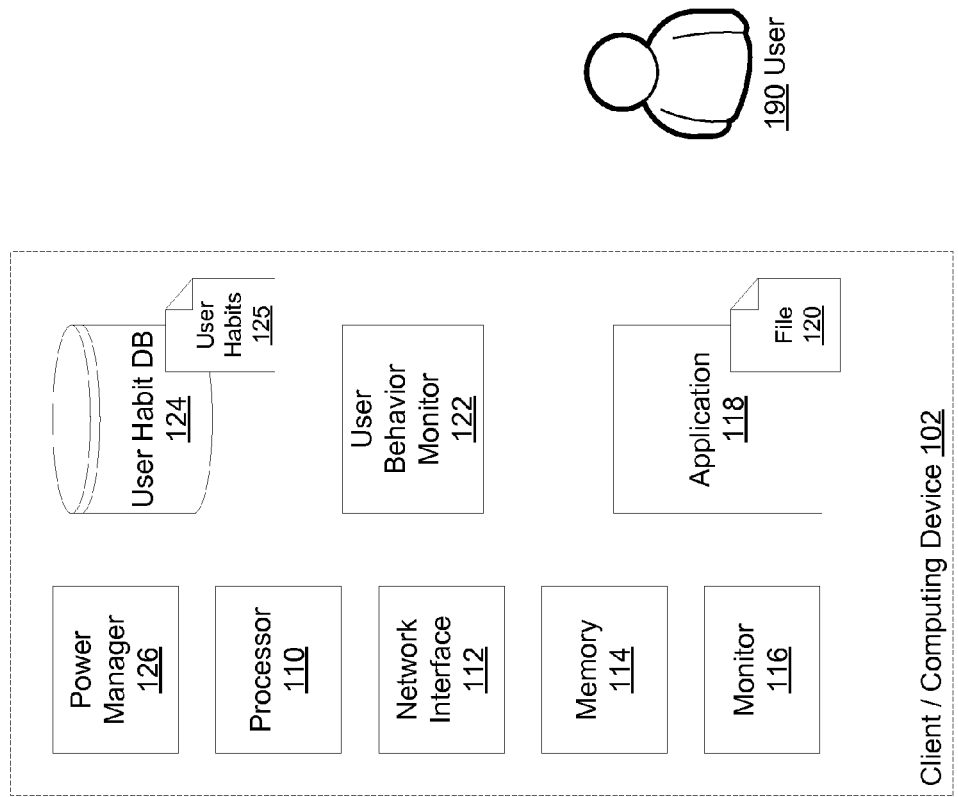
FIG. 1 is a block diagram of an example implementation of a system in accordance with the disclosed subject matter.

FIG. 1 is a block diagram of an example implementation of a system 100 in accordance with the disclosed subject matter.

In various implementations, the system 100 or computing device 102 may include a desktop computer, laptop, netbook, tablet, smartphone or other computing device. In some implementations, the computing device 102 may include a processor 110, which may execute an operating system or applications 118, a memory 114, a monitor 116 (e.g., a touch screen, a liquid crystal display, etc.), and in some implementations, a network interface 112.

As described below, in various implementations, the computing device 102 may have a plurality of power modes (e.g., a working power mode, a full device standby or hibernate power mode, a component standby or off power mode, a full device off power mode, etc.). The entry and exit from these various power modes may be managed by the power manager 126, included within the computing device 102. In various implementations, the power manager 126 may be distributed amongst various sub-systems or components (e.g., memory 114 or monitor 116, etc.).

In one implementation, the computing device 102 may monitor the user 190's behavior (e.g., mouse clicks, keyboard activity, applications executed by the user, etc.) to determine which power mode the device 102 or sub-components thereof should be operating in. For example, in one implementation, the computing device 102 may determine that the user has not interacted with the device 102 for a period of time (e.g., 10 minutes, etc.). In response, the power manager 126 may place the device 102 or a sub-component thereof in a reduced power mode, wherein "reduced" in this context refers to a power mode that consumes less power than the working power mode. In various implementations, the behavior of the user 190 may be monitored by the user behavior monitor 122.

Traditionally, such a period of time may be preconfigured by either the operating system of the device 102 or by the user 190. However, in various implementations, the power manager 126 may base the decision whether to place the device 102 in a reduced power mode not only upon the current behavior of the user 190, but also upon the previous behavior of the user 190 or on the user's habits 125.

In such an implementation, the user behavior monitor 122 may record the behavior of user 190. These individual user interactions or behaviors may be stored within a user habit database (DB) or repository 124. In various implementations, the individual behaviors may not be stored within the user habit DB 124. In such an implementation, the user habit DB 124 may store a value or count of aggregated user behaviors.

For example, one user behavior may include waking the computing device 102 or a sub-component (e.g., monitor 116) from a reduced power mode. In such an implementation, the power manager 126 may place the monitor 116 in a standby power mode after a certain period of inactivity (e.g., 10 minutes, etc.) by the user 190. The user behavior may include an action (e.g., mouse movement, keyboard press, device 102 shake, etc.) returning the monitor 126 to a working or higher power mode.

In such an implementation, the user behavior monitor 122 may record that the user 190's behavior occurred, for example, 10 seconds after the monitor 116 was placed in standby. The user behavior monitor 122 may record that the result of the behavior was the removal of the monitor 116 from standby. In various implementations, the user behavior monitor 122 may record when the behavior occurred, either in absolute time (e.g., 10:00 pm) and/or in relative terms (e.g., 10 seconds after the monitor 116 was placed in standby), what behavior occurred (e.g., the mouse was moved, etc.), the result of that behavior (e.g., removing the monitor 116 from standby), a list of activities, files, or applications executed by the device 102 when the user behavior occurred, etc.

The user behavior monitor 112 may add or store the recorded user behavior within the user habit DB 124. In various implementations, the user habit DB 124 may store individual user behaviors. In such an implementation, the power manager 126 may convert these stored individual user behaviors into the processed (e.g. aggregated, averaged, or counted user behaviors) user habits. In another implementation, the user habit DB 124 may store a processed aggregate, average or count of a plurality of user behaviors, referred to herein as "user habits."

For example, the user habit DB 124 may store an average time after the placing the monitor 116 in standby that the user removed the monitor 116 from standby. In such an implementation, the user behavior described above may cause this average time to be adjusted. In some implementations, the user habit DB 124 may maintain or store a number of averages divided by time (e.g. removal from standby within 3 minutes of entering standby, removal within 10 minutes, removal within 2 hours, etc.) or other metric (e.g., processer usage, network interface usage, etc.). The user habit DB 124 may maintain or store a count or a percentage of the number of times such a user behavior has occurred (e.g., 13% of the time the user removes the monitor from standby within 3 minutes, etc.). It is understood that the above are merely a few illustrative examples to which the disclosed subject matter is not limited.

As described above, traditionally the power manager 126 may determine whether to place the device 102 or a component thereof in a reduced power mode based upon user behavior. In the illustrated implementation, the power manager 126 may determine whether to place the device 102 or a component thereof in a reduced power mode based upon both current user behavior and a history of user habits. For example, the user 190 may exhibit a user behavior by being inactive or not interacting with the device 102 for a period of time (e.g., 10 minutes, etc.). The power manager 126 may determine that it likely that the device 102 or monitor 116 may be placed in a reduced power mode without compromising the user's experience. However, the history of user habits (stored in the user habit DB 124) may indicate that, for example, the user 190 often (e.g. more often than a threshold probability.) removes the monitor 116 from the reduced power mode within 1 minute after the device has been idle for 10 minutes. Based upon these factors, the power manager 126 may determine not to place the device 102 or monitor 116 in a reduced power state.

Conversely, in the illustrated implementation, if the user behavior indicates, for example, that the device 102 has been idle for 30 minutes and the history of user habits indicates that the user 190 rarely (e.g., less often than a threshold probability) removes the monitor 116 from the reduced power mode within 1 minute after the device has been idle for 30 minutes, the power manager 126 may determine to place the device 102 or monitor 116 into a reduced power mode (e.g. standby, etc.). In such an implementation, the power manager 126 may base it determination upon one or more rule sets (e.g. If A and B Then C, If A and (Not B) Then D, an executable script, a probability, etc.), wherein the rule sets consider both the behavior of the user 190 and the history of user's habits. It is understood that the above are merely a few illustrative examples to which the disclosed subject matter is not limited.

It is understood that user behaviors and habits stored and monitored by the user behavior monitor 122, the user habit DB 124 and/or the power manager 126 may vary based upon implementation. In various implementations, the components 123 employed to monitor the user 190's behaviors may include: a proximity sensor, a camera (which may capture visual and/or non-visual light), a human interface device (e.g. a mouse, touchscreen, keyboard, etc.), an accelerometer, a Global Positioning System (GPS) sensor, a monitor hinge, a power supply or battery, a processor 110, a memory 114 (e.g., volatile r non-volatile memory, etc.), or other hardware component capable of providing information from which the user behavior monitor 112 may deduce or infer user behavior. It is understood that the above are merely a few illustrative examples to which the disclosed subject matter is not limited.

In various implementations, the types of user behavior that may be monitored may include: user inactivity, a user request that an application 118 be executed by the device, a user interface action, a user request to access (possibly via an application or via the operating system, etc.) the content of file 120, an operating mode requested by a user 190 (e.g., a particular power mode, a private browsing mode, a full screen display mode, etc.), a removal or addition of a hardware component (e.g. removal of a power adapter, removable storage device, etc.) to the device 102, a usage of a component (e.g. processor 110, network interface 112, etc.), the joining or leaving of a network (e.g., a wireless local area network (WLAN), a cellular network, a wired network, etc.), etc. It is understood that the above are merely a few illustrative examples to which the disclosed subject matter is not limited.

In various implementations, the types of user habits that may be monitored may include: waking the device 102 or a component from a reduced power mode within one or more certain amounts of time from entering the reduced power mode, an amount of network or bandwidth usage at a certain time of day (e.g., that bandwidth usage is high at 8:00 am during weekdays, etc.), a correlation between waking from a reduced power mode and the application(s) 118 executed by the device (e.g. a video player, a video game, a customer relationship management application, etc.), a correlation between the content accessed or processed by an application and waking from a reduced power mode (e.g., a video file, a spreadsheet, a source code file, etc.), a correlation between user behaviors and a physical location (e.g., work, home, etc.), etc. It is understood that the above are merely a few illustrative examples to which the disclosed subject matter is not limited.

As described above, in various implementations, the power manager 126 may determine whether to place the device 102 or a portion thereof into a reduced power mode based, at least in part, upon an application 118 that is being executed by the device 102 or the processor 110. In one implementation, the power manager 126 may determine that the application 118 is an application or type of application that a user 190 is likely not to wish to be affected by a reduced power mode. For example, the power manager 126 may determine that a video player or video game application is being executed, and therefore may determine not to place the device 102 or a component thereof in a reduced power mode (e.g., standby, hibernation etc.). In another implementation, the power manager 126 may determine that an audio player application is being executed, and therefore determine not to place the device 102 or components associated with the audio player (e.g., the network interface 112, memory 114, etc.) in a reduced power mode (e.g., standby, hibernation etc.), but may determine that components not associated with the audio player (e.g., monitor 116, etc.) may be placed in a reduced power mode (e.g. ACPI device power mode D2, monitor standby, etc.). It is understood that the above are merely a few illustrative examples to which the disclosed subject matter is not limited.

In some implementations, the power manager 126 may determine whether to place the device 102 or a portion thereof into a reduced power mode based, at least in part, upon a file or content 120 that is being accessed by application 118 that is executed by the device 102. In some implementations, the power manager 126 may be capable of make this determination based upon the type of file 120 accessed by the application. For example, the accessing of a video file 120 (e.g., 'Moving Picture Experts Group'(MPEG) video file, Audio Video Interleave (AVI), H.264 file, etc.) or an audio file (MPEG-2 Audio Layer 3 (MP3), Advanced Audio Coding (AAC), Free Lossless Audio Codec (FLAC), etc.) may cause the power manager 126 to determine that the reduced power more should not be entered by the device 102 or one or more components thereof. It is understood that the above are merely a few illustrative examples to which the disclosed subject matter is not limited.

In various implementations, the power manager 126 may make this determination based upon how the file 120 is being accessed (e.g., via a network interface 112, via a non-volatile portion of memory 114, etc.). For example, if the file 120 is being accessed from the memory 114 (e.g., a hard drive, etc.), the power manager 126 may determine that the network interface 112 may be placed in a reduced power mode, but that the memory 114 may not. It is understood that the above is merely one illustrative example to which the disclosed subject matter is not limited.

In yet another implementation, the power manager 126 may make this determination based upon various characteristics of the file 120 being accessed. These characteristics may include characteristics such as: the physical size of the file 120, the displayed or pixel size of the accessed file 120, the frame or bit rate of the accessed file 120, the file handle or Universal Resource Locator (URL) of the accessed file 120, the filetype of the accessed file 120, the processor utilization rate to process the accessed file 120, the bandwidth utilization rate associated with the accessed file 120, the network or authentication used to access the file 120 (which, for example, may be determined from the file handle or URL), etc. Specific examples are discussed in more detail in relation to FIGS. 3, 4, and 5. It is understood that the above are merely a few illustrative examples to which the disclosed subject matter is not limited.

In various implementations, the power manager 126 or the user habit DB 124 may correlate a number of user habits with other user habits to aid the determination of whether the device 102 or portion thereof should be placed in a reduced power mode. For example, the user habit of quickly waking the device from the reduced power mode during a certain time of day (e.g., morning, lunch, evening, etc.) may be correlated with the user habit of quickly waking the device from the reduced power mode when a certain application 118 or type of application is being executed (e.g., a web browser, a video game, a spreadsheet, etc.). In such an implementation, the power manager 126 may determine that it is likely a user 190 will quickly wake the device 102 from a reduced power mode if it is evening and the web browser application is executing, but that the user is likely to wake the device during mid-day hours when a spreadsheet application is executing. It is understood that the above are merely a few illustrative examples to which the disclosed subject matter is not limited.

In various implementations, the correlated user habits may include determining based upon application state, such as, is being displayed to a user 190. For example, if an application is minimized, in the background, or otherwise not displayed to shown to a user 190 in a way that user 190 may interact with the application, it may be judged that the user 190 is unlikely to wake the device 102 from a reduced power mode. Conversely, there may be certain applications (e.g., music or audio applications, etc.) that may not be displayed and the user is still likely to wake the device 102 from a reduced power mode. In some implementations, other application state information may include whether an application is docked, has "focus" (receives input from the user), paused, etc. It is understood that the above are merely a few illustrative examples to which the disclosed subject matter is not limited.

In various implementations, the power manager 126 may base the determination of whether to enter the reduced power mode upon one or more thresholds (e.g., percentage of times the user requested the removal of the computing device from the reduced power mode given a certain set of user behaviors, etc.). In some implementations, these thresholds may be based upon the history of user habits and/or correlations between various user habits. In one implementation, the thresholds may be adjusted using a heuristic or learning techniques. It is understood that the above are merely a few illustrative examples to which the disclosed subject matter is not limited.

In some implementations, the power manager 126 may alter which reduced power mode to enter based upon the correlated user habits. For example, if the user 190 walks away from the computing device 102 for 10 minutes and the user 190's prior user habits indicate that the user 190 is likely to be gone for 1 hour, the power manager 126 may place the computing device 102 in a reduced power mode that includes turning off the monitor 116 and attached devices (not shown). Conversely, if the user 190 walks away from the computing device 102 for 10 minutes and the user 190's prior user habits indicate that the user 190 is likely to be gone for 8 hours, the power manager 126 may place the computing device 102 in a reduced power mode that includes a Hibernation mode. It is understood that the above is merely one illustrative example to which the disclosed subject matter is not limited.

Figure 2:
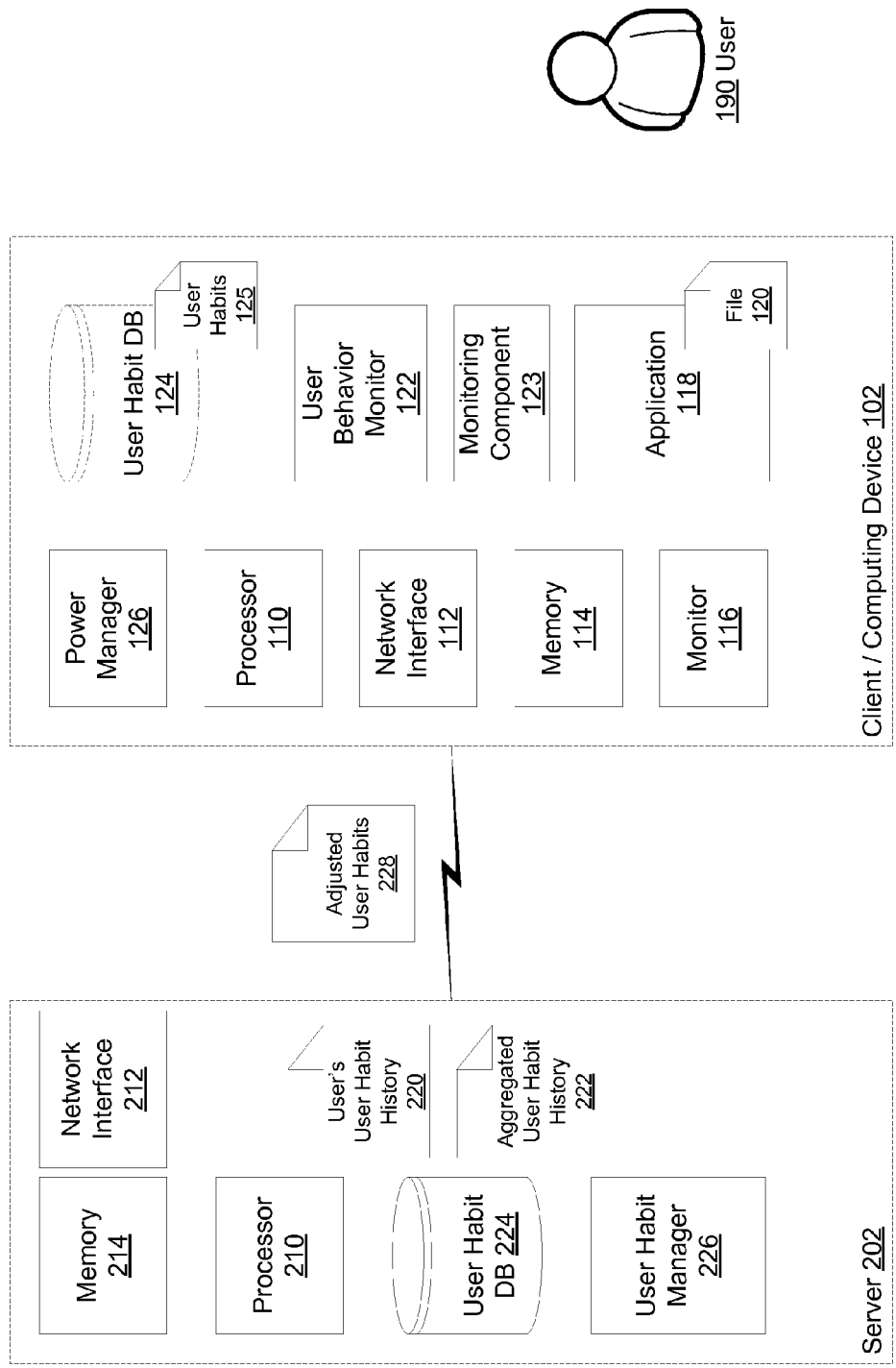
FIG. 2 is a block diagram of an example implementation of a system in accordance with the disclosed subject matter.

FIG. 2 is a block diagram of an example implementation of a system 200 in accordance with the disclosed subject matter. In one implementation, the system 200 may include a computing device 102 and a server 202. In various implementations, the server 202 may be remote from the computing device 102.

In some implementations, the computing device 102 may be the computing device 102 of FIG. 1. In various implementations, the server 202 may include a processor 210, a memory 214, and a network interface 212.

In one implementation, the server 202 may include a user habit database or repository 224. In some implementations, the user habit DB 224 may store various histories of respective user's habits. In such an implementation, the users (e.g., user 190) or the computing devices 102 used by the user 190 upload user habits 228 to the server 202. In such an implementation, the user 190's user habits 228 may be stored within the user habit DB 224.

In various implementations, the computing device 102 may request the user 190's user habit history 220 from the server 202. The server 202 may receive the request. The request may be processed by the user habit manager 226. The user habit manager 226 may be configured to authenticate the user 190 or confirm the authentication, if such authentication was handled by another entity (e.g., network authentication entity, etc.). The user habit manager 226 may, in one implementation, retrieve the user habit history 220 associated with the requesting user 190 form the user habit DB 224. This user habit history 220 may be transmitted to the computing device 102.

In such an implementation, the computing device 102 may receive the user habit history 220. In one implementation, the computing device 102 may use the received user habit history 220 to populate or initialize the user habit DB 124 of the computing device 102. In another implementation, the received user habit history 220 may be used as the user habits 125.

In various implementations, once the user 190 is done with the computing device 102 (e.g., logging out, turning the device 102 off, etc.), the computing device 102 may transmit updated or adjusted user habits 228 to the server 202 for storage. In another implementation, the computing device 102 may transmit adjustments 228 to the user habits to the server 202 at periodic intervals or after a certain number of changes of the user habit history 125 have occurred. In yet another implementation, the adjustments 228 to the user habits may be transmitted to the server prior to the computing device 102 that is to be placed, in whole or part, in a reduced power mode. In some implementations, a combination of one or more triggering events or updating schemes may be employed. It is understood that the above are merely a few illustrative examples to which the disclosed subject matter is not limited.

In various implementations, the computing device 102 may transmit the adjusted user habits 228 to the server 202 as a whole set of user habit history. In another implementation, the computing device 102 may transmit only adjustments or updates to the user habit history, and not the whole user habit history.

In another implementation, the user habit manager 226 may aggregate a plurality of user habits from a plurality of users to create one or more aggregate user habit history sets 222. The aggregated user habit history set(s) 222 may be based on data collected upon user consent. In some implementations, a user can be prompted to explicitly allow data collection. Further, the user 190 may opt in/out of participating in such data collection activities. Furthermore, the collected data can be anonymized prior to performing the analysis to obtain values described above.

In various implementations, the computing device 102 may request an aggregated user habit history set 222 from the server 202. In one implementation, the user habit manager 226 may provide a generic aggregated user habit history set 222. In another implementation, the user habit manager 226 may select one of, or a plurality of, aggregated user habit histories or, in another implementation, the user habit manager 226 may create a customized aggregated user habit history 222 based upon the requesting user 190. In such an implementation, the user habit manager 226 may base the customized aggregated user habit history 222 upon other users which common characteristics as the requesting user 190. Example characteristics may include: demographics, physical location, computing device specifications or components, web browsing habits, etc. It is understood that the above are merely a few illustrative examples to which the disclosed subject matter is not limited.

Figure 3:
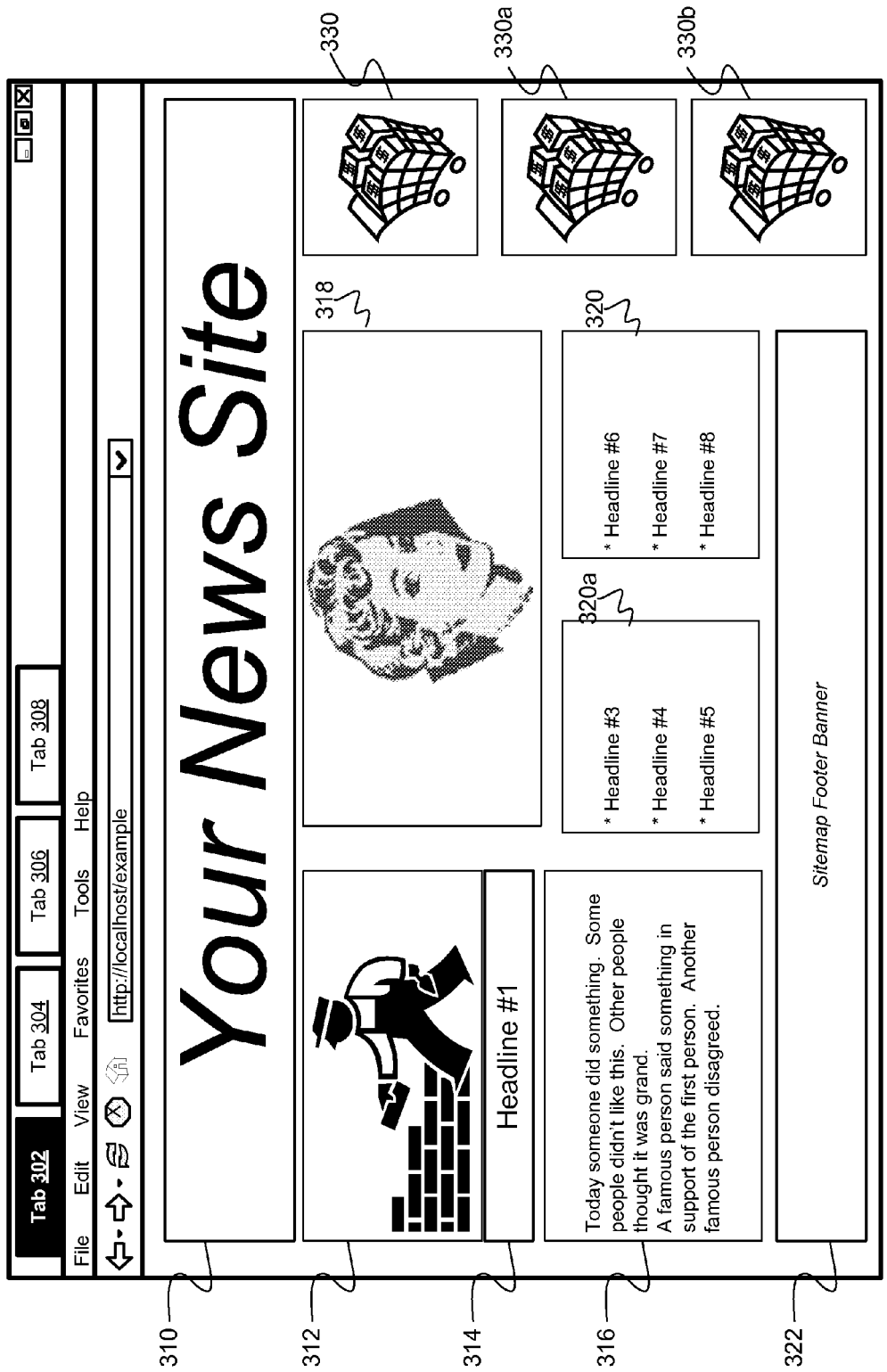
FIG. 3 is a diagram of an example implementation of a user interface in accordance with the disclosed subject matter.

FIG. 3 is a diagram of an example implementation of a web page 300 in accordance with the disclosed subject matter. In various implementations, the web page 300 may be produced by a computing device or application as described in reference to FIG. 1 or 2. As described above, in various implementations, the computing device may determine whether to place the computing device or a portion thereof in a reduced power mode based, at least in part, upon the file or content accessed by an application executed by the computing device. In the illustrated implementation, a web browser is shown, but it is understood that the above is merely one illustrative example to which the disclosed subject matter is not limited.

In one implementation, the web browser may display or provide a web page 300 in a tab 302. In various implementations, the web page 300 may be a new site. It is understood that the above is merely one illustrative example to which the disclosed subject matter is not limited.

The web page 300 may include a number of web page elements. The web page elements 310, 312, 314, 330, 330a, and 330b may include static images. For example, element 310 may be a banner or masthead for the site. Element 312 may be a picture associated with a story. Element 314 may be a headline of the story. Elements 330, 330a, and 330b may be advertisements. Web page elements 316, 320, 320a, and 322 may include text based elements. Element 316 may be the text of the news story. Elements 320 and 320a may be hyperlinks to additional stories. Element 322 may be a sitemap or series of hyperlinks to various pages on the news site.

Web page element 318 may include a video. As described above, in various implementations, the computing device or power manager may determine whether to place the computing device or a portion thereof into a reduced power mode based upon the file or content accessed by an application. In the illustrated implementation, the power manager or computing device may determine that the reduced power mode should not be entered into if an application is playing a video file. It is understood that the above is merely one illustrative example to which the disclosed subject matter is not limited.

In such an implementation, the power manager may determine what type of file or content is being accessed by the web browser. In this context, "filetype" may include the type of content or format a file is encoded; for example files containing images, text, video, etc. may be regarded as having different filetypes or being different types of files. Further, the distinction of filetype may have various levels of granularity. For example, a text file may be considered to be of a different filetype than video files, but, in some implementations, various text file formats (e.g. plan text, Rich Text Format (RTF), Extensible Markup Language (XML), etc.), various video files formats (e.g., Audio Video Interleave (AVI), Matroska (MKV), MPEG-4 Part 14 (MP4), WebM, etc.) or other sub-categorizations of file types may be treated as different types of files. It is understood that the above are merely a few illustrative examples to which the disclosed subject matter is not limited.

In various implementations, as the web browser accesses each web page element (e.g., image 312, video 318, etc.) the power manager may inspect what type of file is being accessed. For example, the determination of filetype may be based upon an extension associated with the file (e.g., jpeg, mov, etc.) or a Multipurpose Internet Mail Extensions (MIME) type information associated with the file. In some implementations, the application or web browser may indicate to the power manager what type of file is being accessed (e.g., when a Hypertext Markup Language (HTML) video tag is processed, etc.). It is understood that the above are merely a few illustrative examples to which the disclosed subject matter is not limited.

Figure 4:
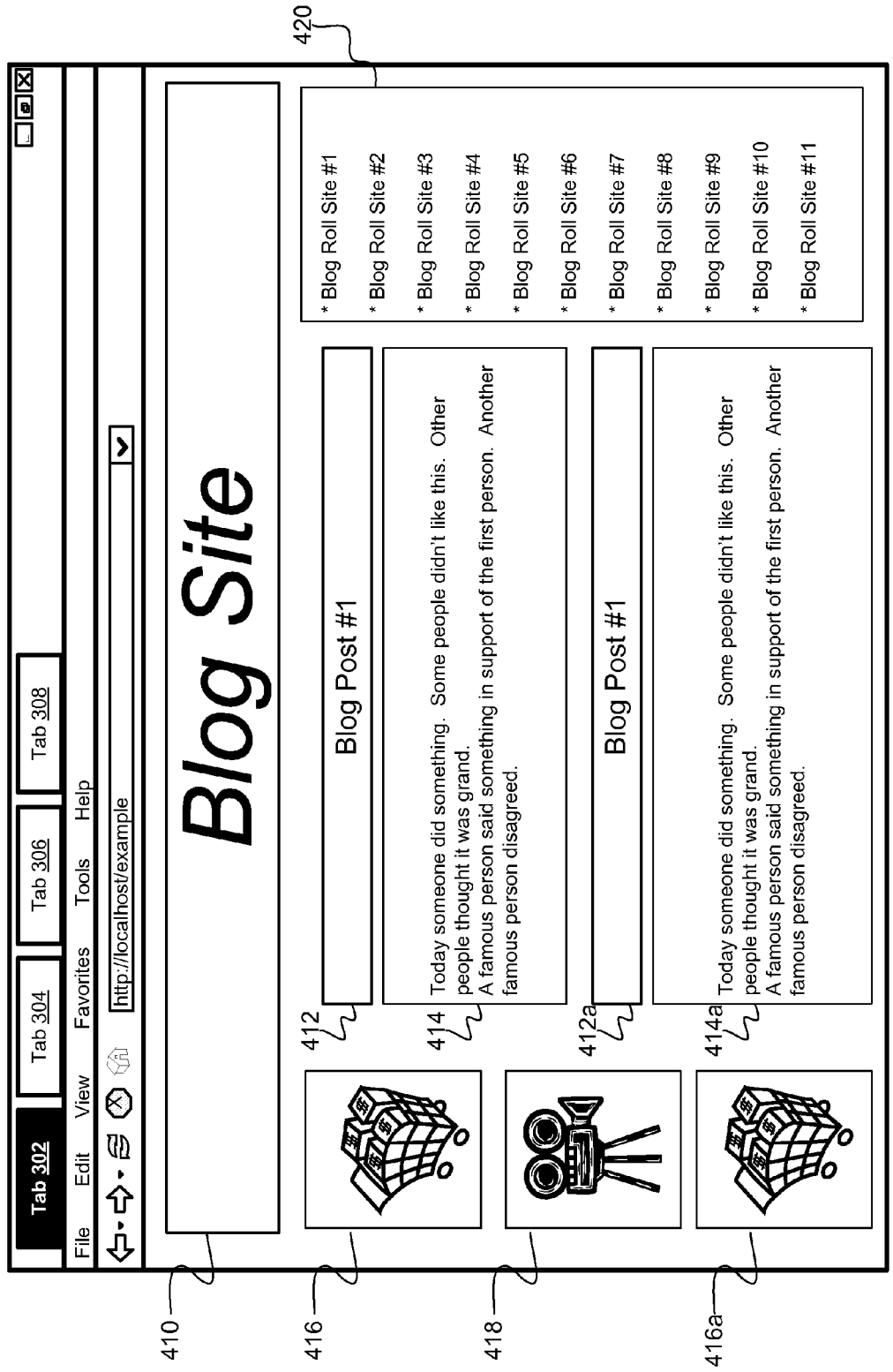
FIG. 4 is a diagram of an example implementation of a user interface in accordance with the disclosed subject matter.

FIG. 4 is a diagram of an example implementation of a web page 400 in accordance with the disclosed subject matter. In various implementations, the web page 400 may be produced by a computing device or application as described in reference to FIG. 1 or 2. As described above, in various implementations, the computing device may determine whether to place the computing device or a portion thereof in a reduced power mode based, at least in part, upon the file or content accessed by an application executed by the computing device. In the illustrated implementation, a web browser is shown, but it is understood that the above is merely one illustrative example to which the disclosed subject matter is not limited.

FIG. 3 illustrates an implementation in which the computing device or power manager may determine whether to place the computing device or portion thereof in a reduced power state based, in part, upon the type of file or content accessed by an application (e.g., a web browser, etc.). FIG. 4 illustrates that, in some implementations, the computing device or power manager may make this determination based upon particular characteristics of the file or content. As described above, in various implementations, the file type determination may be based upon the content or file formatting of the file. In this context, a file's "characteristics" may include: the frame rate at which the file is encoded, the bit rate at which the file is encoded, the frame size at which the file is encoded, the physical size (e.g., kilobytes, etc.) of the file, the system resource utilization (e.g., processor usage, bandwidth usage, etc.) to process or access the file, etc. It is understood that the above are merely a few illustrative examples to which the disclosed subject matter is not limited.

It is also understood that an application or user may display or otherwise process a file in a way that differs from the file's characteristics or encoding. For example, a video file may be encoded with a particular a frame size, bit rate, and frame rate, etc. but displayed with another frame size, bit rate or frame rate, etc.

In a specific example, a Digital Versatile Disc-Video (DVD-Video, or most often just referred to as a "DVD") with a common National Television System Committee (NTSC) video encoding (e.g., a Region 1 DVD) may include a video file encoded to have the following file characteristics: an encoded video/image portion with a frame rate of 29.97 frames/sec, interlaced; an encoded video/image portion with a frame size of 720×480 pixels; an encoded video/image portion with a bitrate of up to 9.8 Mbit/sec; an audio portion with a 48 kHz sampling rate; an audio portion with 6 channels (a.k.a. 5.1 channels or surround sound); and an audio portion with a bit rate of up to 448 kbit/s.

However, it is understood that the user or device may display the video file differently than indicated by the file's characteristics. For example, the device may only have two speakers (stereo) and the device may downmix the 5.1 surround sound channels to 2 stereo channels. Likewise, the video may be displayed in a fullscreen mode on a display having 1600×900 pixels, and the displayed frame size may be enlarged (e.g., via pixel doubling, interpolation, upscaling, etc.) from the encoded frame size of 720×480 to, for example, a displayed frame size of 1440×860 or 1600×900 pixels. In this context, such modified characteristics (e.g., the 2 channel sound, the 1440×860 frame size, etc.) may be referred to as the file's "displayed characteristics" or "processed characteristics" in the case of files with are not displayed to a user (e.g., audio files, etc.). In the illustrated implementations, for the sake of simplifying the example implementations the video and other files may be displayed using the same characteristics as they are encoded, unless otherwise noted. For example, the video 318 of FIG. 3 may be both encoded and displayed with a frame size of 640×360 pixels. It is understood that the above simplification is merely one illustrative example to which the disclosed subject matter is not limited.

In the illustrated implementation, the web page 400 may include a blog site, which includes a plurality of web page elements. In one implementation, the web page elements 410, 416, and 416a may be image elements (e.g., banners, advertisements, etc.). The web page elements 412, 412a, 414, 414a, and 420 may be text based web elements (e.g., blog posts, headlines, blog roll hyperlinks, etc.). It is understood that the above are merely a few illustrative examples to which the disclosed subject matter is not limited.

In one implementation, the web element 418 may include a video. In one implementation, the encoded frame size video 418 may be relatively small (e.g., 278 pixels wide by 200 pixels tall, etc.). In another implementation, the video 418 may include a video file encoded with (and in one implementation, displayed with) a relatively low framerate (e.g., 8 frames per second, etc.). In such an implementation, the video 418 may be relatively negligible for the processor to process and may contribute little to the processor utilization. It is understood that the above are merely a few illustrative examples to which the disclosed subject matter is not limited.

In such an implementation, the power manager may determine that the user is unlikely to wake the computing device or portion thereof (e.g., the monitor, etc.) to watch the video 418. In such an implementation, the video 418's framerate, displayed or frame size, or processor utilization, etc. may be below one or more thresholds used to determine whether the video should be a significant factor in preventing the device from entering reduced power mode. In various implementations, these threshold or thresholds, if more than one is used, may be adjusted based upon a history of user habits (e.g., how often a user woke the computing device when a video less than the threshold was playing, etc.).

This is contrasted with the video 318 of FIG. 3, which may include an encoding that is relatively large larger video (e.g., 1280×720 pixels, etc.), a or that is encoded at a relatively higher framerate (e.g., 24 frames per second, etc.), etc. In such an implementation, the power manager may determine that the video 418 is a video that would cause the user to awaken the computing device from a reduced power mode. In such an implementation, the power manager may determine that the computing device should not be placed in the reduced power mode. It is understood that the above are merely a few illustrative examples to which the disclosed subject matter is not limited. As described above, in various implementations, these threshold or thresholds, if more than one is used, may be adjusted based upon a history of user habits (e.g., how often a user woke the computing device when a video less than the threshold was playing, etc.).

Figure 5:
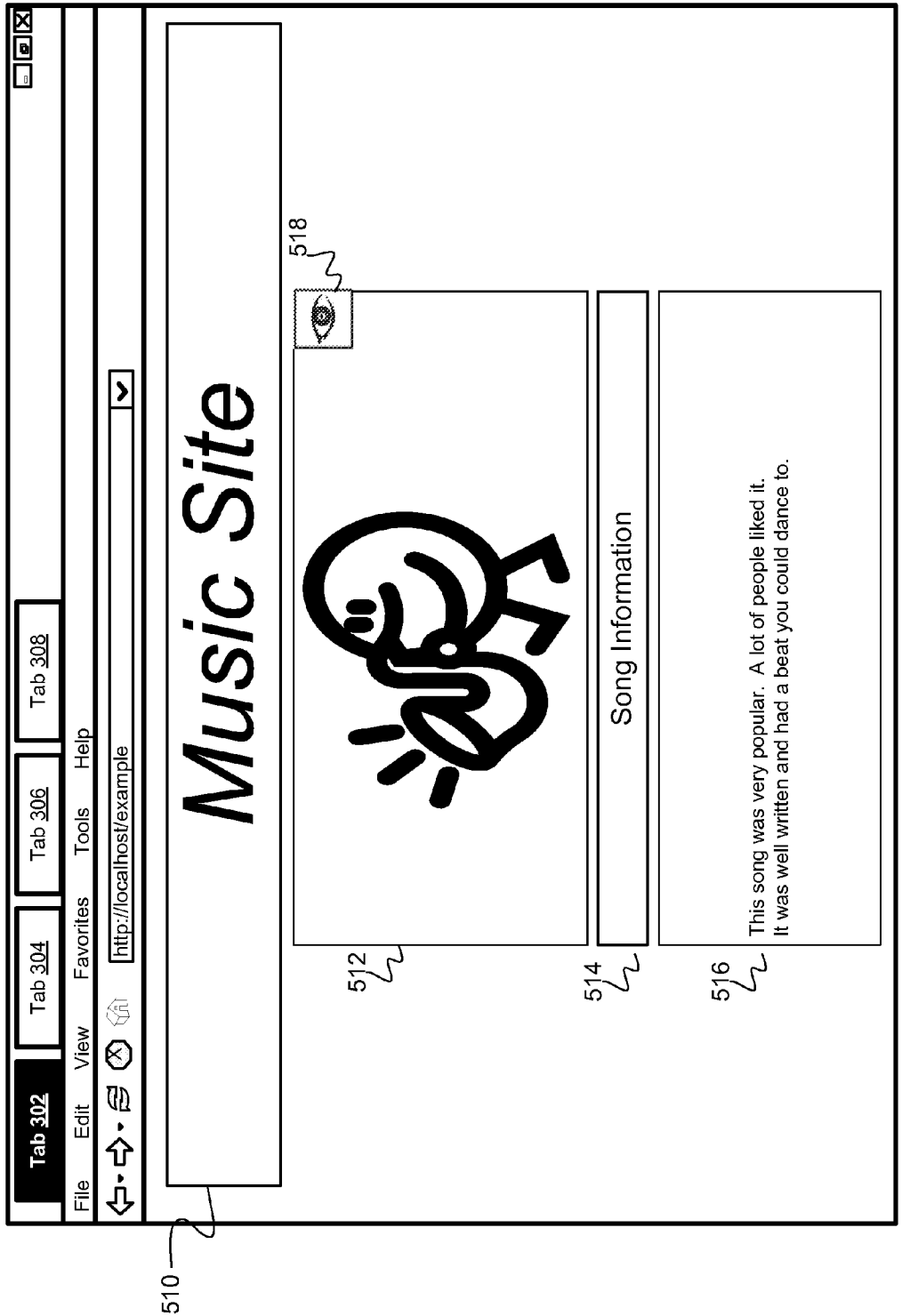
FIG. 5 is a diagram of an example implementation of a user interface in accordance with the disclosed subject matter.

FIG. 5 is a diagram of an example implementation of a web page 500 in accordance with the disclosed subject matter. In various implementations, the web page 500 may be produced by a computing device or application as described in reference to FIG. 1 or 2. As described above, in various implementations, the computing device may determine whether to place the computing device or a portion thereof in a reduced power mode based, at least in part, upon the file or content accessed by an application executed by the computing device. In the illustrated implementation, a web browser is shown, but it is understood that the above is merely one illustrative example to which the disclosed subject matter is not limited.

In contrast to FIGS. 3 and 4, which illustrated video file or content, FIG. 5 or web page 500 illustrates an audio file or content. It is understood that the above are merely a few illustrative examples to which the disclosed subject matter is not limited.

In one implementation, the web page 500 may include a music site which streams music. In various implementations, the web page 500 may include graphic web page elements 510 and 514 (e.g., a banner, cover art, etc.). The web page 500 may also include text web page element 516 (e.g., a song review, etc.).

In the illustrated implementation, the web page 500 may also include an audio element 512. In various implementations, the computing device or power manager may determine that an audio file is being accessed based on one or more of the following: detection of input signals to an audio sub-system or speakers, detection of a particular filetype of the audio file that indicates audio content of the file (e.g., an mp3, m4a, etc. filetype), an HTML audio tag, etc. In some implementations, the power manager may determine that an audio file is being played or accessed by the URL of the web page 500. For example, the URLs of popular audio services may be known to the power manager. It is understood that the above are merely a few illustrative examples to which the disclosed subject matter is not limited.

As described above, in some implementations, the power manager may examine various characteristics of the accessed audio file to determine whether a reduced power mode should be entered. Examples of such characteristics may include: the length (e.g. seconds, etc.) of the audio file, the physical size (e.g., megabytes, etc.) of the audio file, the bitrate of the audio file, the filetype of the audio file, etc. It is understood that the above are merely a few illustrative examples to which the disclosed subject matter is not limited.

In one implementation, the characteristics of the audio file may be below one or more thresholds, as described above, and the power manager may determine that a user would not mind if the device entered a reduced power mode. For example, the audio file may be an advertising jingle and have a relatively short audio length (e.g., less than 60 seconds) and a relatively low encoded bitrate (e.g., 64 bps). In such an implementation, the power manager may determine that the audio length file characteristic is below the "audio length" threshold (e.g., 2 minutes, etc.) and that the bitrate is below the "encoded bitrate" threshold (e.g., 96 bps) and determine that the user would not mind if the device entered a reduced power mode while the advertising jingle audio file is being played.

In another implementation, the audio file may be above one or more thresholds, and the power manager may determine that the device or portion thereof may not be placed in the reduced power mode. For example, the audio file may be an audiobook and, while including a relatively low encoded bitrate (e.g., 64 bps), the file may have a relatively long audio length (e.g., 8 hours). In such an implementation, while the file's characteristics include an encoded bitrate below the respective threshold, the file's audio length may exceed the threshold. Therefore, in such an implementation, the power manager may determine that the device or portion thereof may not be placed in the reduced power mode while the audiobook is being played. It is understood that the above are merely a few illustrative examples to which the disclosed subject matter is not limited. Other thresholds (e.g., file types, file characteristics, etc. as described above) and other combinations of thresholds are contemplated.

Alternatively, in various implementations, the power manager may determine that the audio file may be played or experienced by a user even if portions of the device are in the reduced power mode. For example, the power manager may place the monitor in the reduced power mode. If the audio file is streaming over a network, the power manager may not place the network interface in a reduced power mode, but may place a hard drive in a reduced power mode. It is understood that the above are merely a few illustrative examples to which the disclosed subject matter is not limited.

In various implementations, other thresholds and characteristics may be employed for various types of content or files which are accessed by applications. As described above, these thresholds may be altered or adjusted based upon user behaviors. These adjustments may be transmitted to a remote server.

In some implementations, a user may explicitly identify content characteristics or applications which cause the power manager to refrain from placing the computing device or portion thereof in a reduced power mode. For example, a user may indicate that whenever a certain URL is being accessed the device may not enter a reduced power mode. In the illustrated implementation, the user interface (UI) element 518 may be employed by a user to instruct the power manager to create or modify a rule that anytime the audio file 512 is being accessed the device should not enter a reduced power mode. It is understood that the above is merely one illustrative example to which the disclosed subject matter is not limited.

FIG. 6 is a flowchart of an example implementation of a technique 600 in accordance with the disclosed subject matter. In various implementations, the technique 600 may be used or produced by the systems such as those of FIG. 1, 2, or 7. Furthermore, portions of technique 600 may involve applications and content such as that of FIG. 3, 4, or 5. It is understood that the above are merely a few illustrative examples to which the disclosed subject matter is not limited. It is understood that the disclosed subject matter is not limited to the ordering of or number of actions illustrated by technique 600.

Block 602 illustrates that, in one implementation, a user's behavior in regards to a computing device may be monitored, as described above. In various implementations, one or more of the action(s) illustrated by this Block may be performed by the apparatuses or systems of FIG. 1, 2, or 7, the user behavior monitor 122 of FIGS. 1, 2, as described above.

Block 604 illustrates that, in one implementation, a determination may be made as to whether to place the computing device in a reduced power mode, as described above. In various implementations, this determination may be based upon the user's current behavior and a history of user habits, as described above. In some implementations, placing the computing device in a reduced power mode may include placing only a portion of the computing device (e.g., a monitor, a network interface, a hard drive, etc.) in a reduced power mode, as described above.

In some implementations, this determination may include determining a type content accessed by an application executed by the computing device, as described above. Further determining may be further based upon the type content accessed by the application, as described above. In various implementations, determining may include determining if the content is a video file, audio file, etc., as described above.

In another implementation, determining may include determining whether to place the computing device in a reduced power mode further based at least one characteristic of a file accessed by an application executed by the computing device, as described above. In various implementations, these file characteristics may include a bitrate of the file, a frame size of the file, a physical size of the file, a processor utilization rate to process the file, a filetype of the file, etc., as described above.

In yet another implementation, determining may include requesting a history of user habits from a remote repository of user habit histories, as described above. In various implementations, the history of user habits includes a set of user habits created by aggregating user habits from a plurality of users, as described above.

In various implementations, one or more of the action(s) illustrated by this Block may be performed by the apparatuses or systems of FIG. 1, 2, or 7, the power manager 126 of FIGS. 1, 2, as described above.

Block 606 illustrates that, in one implementation, if it is determined to place the computing device in the reduced power mode, the computing device may then be placed in the reduced power mode, as described above. In some implementations, placing the computing device in a reduced power mode may include placing only a portion of the computing device (e.g., a monitor, a network interface, a hard drive, etc.) in a reduced power mode, as described above. In various implementations, one or more of the action(s) illustrated by this Block may be performed by the apparatuses or systems of FIG. 1, 2, or 7, the power manager 126 of FIGS. 1, 2, as described above.

Block 608 illustrates that, in one implementation, a request the user to remove the computing device from the reduced power mode may be received from, as described above. In various implementations, one or more of the action(s) illustrated by this Block may be performed by the apparatuses or systems of FIG. 1, 2, or 7, the user behavior monitor 122 or power manager 126 of FIGS. 1, 2, as described above.

Block 610 illustrates that, in one implementation, the history of user habits may be adjusted to reflect the request from the user, as described above. In one implementation, adjusting may include transmitting the adjusted history of user habits to a remote repository of user habit histories, as described above. In some implementations, adjusting may include transmitting an adjustment to the history of user habits to a remote repository of user habit histories, as described above. In such an implementation, the history of user habits is associated with the user of the computing device, as described above. In various implementations, one or more of the action (s) illustrated by this Block may be performed by the apparatuses or systems of FIG. 1, 2, or 7, the user behavior monitor 122 or power manager 126 of FIGS. 1, 2, as described above.

Block 612 illustrates that, in one implementation, the computing device or portion thereof may be removed from the reduced power mode, as described above. In various implementations, one or more of the action(s) illustrated by this Block may be performed by the apparatuses or systems of FIG. 1, 2, or 7, the user behavior monitor 122 or power manager 126 of FIGS. 1, 2, as described above.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, by a computing device, a history of user habits for a user of the computing device from a remote repository, the history of user habits being based on the user's behavior on a plurality of computing devices;
   monitoring, by the computing device, the user's current behavior in regards to the computing device;
   transmitting information associated with the monitored user's current behavior to the remote repository;
   determining whether to place the computing device in a reduced power mode based upon the user's monitored current behavior and based on the history of user habits for the user on the plurality of computing devices; and
   if it is determined to place the computing device in the reduced power mode, placing the computing device in the reduced power mode.

2. The method of claim 1, further comprising:
   receiving a request from the user to remove the computing device from the reduced power mode;
   adjusting the history of user habits to reflect the request from the user; and
   removing the computing device from the reduced power mode.

3. The method of claim 2, wherein adjusting the history of user habits includes transmitting the adjusted history of user habits to the remote repository of user habit histories.

4. The method of claim 2, wherein adjusting the history of user habits includes:
   transmitting an adjustment to the history of user habits to the remote repository of user habit histories, and
   wherein the history of user habits is associated with the user of the computing device.

5. The method of claim 1, further comprising:
   determining a type of content accessed by an application executed by the computing device, and
   wherein determining whether to place the computing device in the reduced power mode is further based upon the type of content accessed by the application.

6. The method of claim 5, wherein determining the type of content includes determining whether the content is a video file.

7. The method of claim 1, wherein determining includes:
   determining whether to place the computing device in the reduced power mode is further based on at least one characteristic of a file accessed by an application executed by the computing device, wherein the characteristic includes at least one characteristic selected from the following group comprising:
   an encoded bitrate of the file,
   an encoded frame size of the file,
   a physical size of the file,
   a processor utilization rate to process the file, and
   a filetype of the file.

8. The method of claim 1, wherein determining whether to place the computing device in the reduced power mode based upon the history of user habits includes:
    requesting the history of user habits from the remote repository.

9. The method of claim 1, wherein the history of user habits includes a set of user habits created by aggregating user habits from a plurality of users.

10. An apparatus comprising:
    one or more processors; and
    a memory configured to store executable code that, when executed by the one or more processors, causes the apparatus to:
        receive a history of user habits for a user of the apparatus from a remote repository, the history of user habits being based on the user's behavior on a plurality of computing devices;
        monitor the user's current behavior in regards to the apparatus;
        transmit information associated with the monitored user's current behavior to the remote repository;
        determine whether to place at least a portion of the apparatus in a reduced power mode based upon the user's monitored current behavior and the history of user habits for the user on the plurality of computing devices; and
        if it is determined to place at least a portion of the apparatus in the reduced power mode, place at least a portion of the apparatus in the reduced power mode.

11. The apparatus of claim 10, wherein the executable code, when executed by the one or more processors, further causes the apparatus to:
    receive a request from the user to remove the at least one portion of apparatus from the reduced power mode;
    adjust the history of user habits to reflect the request from the user; and
    remove the at least one portion of apparatus from the reduced power mode.

12. The apparatus of claim 11, wherein the executable code, when executed by the one or more processors, further causes the apparatus to transmit the adjusted history of user habits to the remote repository.

13. The apparatus of claim 11, wherein the executable code, when executed by the one or more processors, further causes the apparatus to transmit an adjustment to the history of user habits to the remote repository, wherein the history of user habits is associated with the user of the computing device.

14. The apparatus of claim 10, wherein the executable code, when executed by the one or more processors, further causes the apparatus to:
    determine a of type content accessed by an application executed by the apparatus, and
    determine whether to place the at least one portion of the apparatus in a reduced power mode further based upon the type content accessed by the application.

15. The apparatus of claim 14, wherein the executable code, when executed by the one or more processors, further causes the apparatus to determine whether the content is a video file.

16. The apparatus of claim 10, wherein the executable code, when executed by the one or more processors, further causes the apparatus to:
    determine whether to place at least a portion of the apparatus in a reduced power mode further based at least one characteristic of a file accessed by an application executed by the apparatus, wherein the characteristic includes at least one characteristic selected from the group consisting of:
    an encoded bitrate of the file,
    an encoded frame size of the file,
    a physical size of the file,
    an estimated processor utilization rate to process the file, and
    a filetype of the file.

17. The apparatus of claim 10, wherein the executable code, when executed by the one or more processors, further causes the apparatus to request the history of user habits from the remote repository.

18. The apparatus of claim 10, wherein the history of user habits includes a set of user habits created by aggregating user habits from a plurality of users.

19. A non-transitory computer-readable medium including executable code that, when executed, causes an apparatus to:
    receive a history of user habits for a user of the apparatus from a remote repository, the history of user habits being based on the user's behavior on a plurality of computing devices;
    monitor the user's behavior in regards to the apparatus;
    transmit information associated with the monitored user's behavior to the remote repository;
    determine whether to place at least a portion of the apparatus in a reduced power mode based upon the user's monitored behavior and the history of the user on the plurality of computing devices; and
    if it is determined to place at least a portion of the apparatus in the reduced power mode, placing the at least a portion of the apparatus in the reduced power mode.

20. The non-transitory computer-readable medium of claim 19, wherein the executable code, when executed by the one or more processors, further causes the apparatus to:
    receive a request from the user to remove the at least a portion of the apparatus from the reduced power mode;
    adjust the history of user habits to reflect the request from the user; and
    remove the at least a portion of the apparatus from the reduced power mode.

* * * * *